United States Patent
Morikawa et al.

(10) Patent No.: US 6,835,940 B2
(45) Date of Patent: Dec. 28, 2004

(54) RADIATION IMAGE CONVERSION PANEL

(75) Inventors: Osamu Morikawa, Hachioji (JP); Satoshi Honda, Hachioji (JP)

(73) Assignee: Konica Corporation (JP)

( * ) Notice: Subject to any disclaimer, the term of this patent is extended or adjusted under 35 U.S.C. 154(b) by 136 days.

(21) Appl. No.: 10/364,020

(22) Filed: Feb. 10, 2003

(65) Prior Publication Data
US 2003/0155529 A1 Aug. 21, 2003

(30) Foreign Application Priority Data
Feb. 18, 2002 (JP) .......................... 2002-039787

(51) Int. Cl.$^7$ .............................................. G01T 1/202
(52) U.S. Cl. .............................. 250/484.4; 250/484.4; 250/484.2; 250/483.1
(58) Field of Search .................... 250/484.4, 484.2, 250/483.1, 472.1, 390.11, 390.01, 336.1

(56) References Cited

U.S. PATENT DOCUMENTS 5,166,512 A * 11/1992 Kubo ................... 250/214 VT
2003/0151001 A1 * 8/2003 Honda et al. ............. 250/484.4
2004/0149932 A1 * 8/2004 Nakano et al. ........... 250/484.4
2004/0155224 A1 * 8/2004 Nakano et al. ........ 252/301.4 H

FOREIGN PATENT DOCUMENTS

| JP | 61-142497 | 6/1986 |
| JP | 61-142500 | 6/1986 |
| JP | 62-039737 | 2/1987 |
| JP | 62-110200 | 5/1987 |
| JP | 02-058000 | 2/1990 |

* cited by examiner

Primary Examiner—David Porta
Assistant Examiner—Christine Sung
(74) Attorney, Agent, or Firm—Cantor Colburn LLP

(57) ABSTRACT

A radiation image conversion panel is disclosed, comprising a support having thereon a stimulable phosphor layer comprising columnar stimulable phosphor crystals, wherein the tip of the columnar crystals have a tip exhibiting an average angle of 20° to 80° which a centerline in the direction of crystal growth makes with a line tangent to a section of the tip having the centerline.

13 Claims, 3 Drawing Sheets

RADIATION IMAGE CONVERSION PANEL

FIELD OF THE INVENTION

The present invention relates to a radiation image conversion panel and in particular to a radiation image conversion panel exhibiting enhanced luminance and improved sharpness.

BACKGROUND OF THE INVENTION

In recent years, radiographic imaging methods have been employed using a radiation image conversion panel employing photo-stimulable phosphors (hereinafter also denoted simply as stimulable phosphors). For example, as disclosed in U.S. Pat. No. 3,859,527 and JP-A No. 55-12144 (hereinafter, the term, JP-A refers to Japanese Patent Application Publication), there is a radiation image conversion panel having a stimulable phosphor layer on the support. The stimulable phosphor layer of the radiation image conversion panel is exposed to radiation rays having passed through respective portions of the object to accumulate radiation energy corresponding to radiation ray transmittance of the respective portion of the object in the stimulable phosphor layer to form latent images (accumulated images) and scanning the stimulable phosphor layer with stimulating light (laser lights are usually used) causes the accumulated radiation ray energy to be radiated to emit light, the intensities of which are read to forming images. The thus formed images may be reproduced on various displays such as CRT or reproduced in the form of a hard copy.

The stimulable phosphor layer of the radiation image conversion panel used in the radiation image conversion method requires enhanced radiation absorption efficiency, enhanced light conversion efficiency, superior image graininess and high sharpness.

To enhance sensitivity to radiation, it is necessary to increase the thickness of the stimulable phosphor layer. However, an excessively thick layer often causes a phenomenon in which stimulated emission light is scattered between phosphor grains, preventing emission from the layer. With regard to sharpness, a thinner phosphor layer results in enhanced sharpness but an excessively thin layer leads to reduced sensitivity.

Image graininess, in general, depends on local fluctuation in radiation quantum number (so-called quantum mottle) or structural disorder of the stimulable phosphor layer of the radiation image conversion panel (so-call structure mottle). Decreasing the phosphor layer thickness results in a decreased number of radiation quantum to increase the mottle or leads to markedly increased structural disorder to cause the structure mottle to increase, forming deteriorated images. Accordingly, a thinner phosphor layer is needed to enhance image graininess.

As described above, image quality and sensitivity in radiation image conversion methods using the radiation image conversion panel are dependent on various factors. There have been made various studies to achieve improvements in sensitivity and image quality by adjusting plural factors relating to the sensitivity and image quality. Of these, an attempt in controlling the form of stimulable phosphor grains to enhance sensitivity and image quality was made as a means for improving sharpness of radiographic images. For example, JP-A No. 61-142497 discloses a method of using a stimulable phosphor layer comprising a fine columnar block which has been formed by sedimentation of a stimulable phosphor on a support having fine protruded patterns; JP-A 62-39737 discloses a method of using a radiation image conversion panel having a stimulable phosphor layer having a pseudo-columnar form which has been formed by producing cracks on the layer surface side; JP-A 62-110200 proposes a method in which a stimulable phosphor layer having voids is formed by vapor deposition onto the upper surface of a support, followed by growing voids by subjecting a heating treatment to produce cracks.

JP-A No. 2-58000 proposed a radiation image conversion panel having a stimulable phosphor layer, in which long and thin columnar crystals were formed with an incline at a given angle toward the direction normal to the support.

In the foregoing attempts to control the stimulable phosphor layer form, it was intended to enhance image quality by allowing the phosphor layer to have a columnar crystal structure. It was supposed that the columnar form prevented traverse diffusion of stimulated emission light (or photo-stimulated luminescence), i.e., the light reached the support surface with repeating reflection at the interface of cracks (or columnar crystals), thereby leading to markedly enhanced sharpness of images formed by the stimulated luminescence.

However, enhanced image quality is still desired even in radiation image conversion panels having the stimulable phosphor layer which has been formed by the foregoing vapor-phase growth (deposition) and in which the relationship between luminance and sharpness has not achieved sufficient characteristics.

There have been made an attempt to improve image quality, specifically, sharpness in radiation image conversion panel having a stimulable phosphor layer which was formed through gas phase growth (deposition), as described in JP-A No. 1-131498. This was achieved by the combination of a phosphor layer comprised of columnar stimulable phosphor crystals described above and a low refractive layer, thereby preventing reflection or refraction at the interface between layers and leading to enhanced image quality.

At the reading stage in the radiation image recording and reproducing method, stimulating light is irradiated onto one surface side of the radiation image conversion panel, stimulated luminescence emitted from phosphor particles (stimulated emission) is taken out by means of a light-receiving guide provided on stimulating light-irradiating side and read through photoelectric conversion. A method of receiving stimulated luminescence from both sides of the radiation image conversion panel (both-side light-concentrating and reading method) is also employed in cases when desired to take out stimulated luminescence emitted for stimulable phosphor particles as much as possible or in cases where radiation energy accumulation image formed in the stimulable phosphor layer varies in the direction of depth of the phosphor layer with respect to energy intensity distribution and it is intended to obtain the variation of the energy intensity distribution as image information. The both-side light-concentrating and reading method is disclosed, for example, in JP-A No. 55-87970.

Superiority of a radiation image conversion system employing radiation image conversion panels is greatly dependent on stimulated emission luminance (also called sensitivity) and sharpness of the obtained image, which are known to be affected by characteristics of the stimulable phosphor.

However, the foregoing radiation image conversion panels having the stimulable phosphor layer which has been formed by the foregoing vapor-phase growth (deposition) have not achieved enhanced luminance and improved sharpness as desired on the market and further improvements are required.

SUMMARY OF THE INVENTION

The present invention has been made in light of the foregoing. It is an object of the invention to provide a radiation image conversion panel exhibiting enhanced luminance and superior sharpness.

The present invention has been accomplished by the following constitution:

1. A radiation image conversion panel comprising a support having thereon a stimulable phosphor layer comprising columnar stimulable phosphor crystals, wherein the columnar crystals have a tip having an angle of 20° to 80° between a centerline in the direction of crystal growth and a line tangent to a section of the tip along the centerline;

2. The radiation image conversion panel described in 1., wherein the columnar crystals have an average diameter of 0.5 to 50 μm;

3. The radiation image conversion panel described in 1. or 2., wherein the stimulable phosphor layer comprises a stimulable phosphor represented by the following formula (1)

$$M^1X.aM^2X'_2.bM^3X''_3:eA \qquad \text{formula (1)}$$

wherein $M^1$ represents an alkali metal selected from the group consisting of Li, Na, K, Rb and Cs; $M^2$ represents a divalent metal selected from the group consisting of Be, Mg, Ca, Sr, Ba, Zn, Cd, Cu and Ni; $M^3$ represents a trivalent metal selected from the group consisting of Sc, Y, La, Ce, Pr, Nd, Pm, Sm, Eu, Gd, Tb, Dy, Ho, Er, Tm, Yb, Lu, Al, Ga and In; X, X' and X" each represent a halogen selected from the group consisting of F, Cl, Br and I; A represents a metal selected from the group consisting of Eu, Tb, In, Ga, Cs, Ce, Tm, Dy, Pr, Ho, Nd, Yb, Er, Gd, Lu, Sm, Y, Ti, Na, Ag, Cu and Mg; a, b and e are each $0 \leq a < 0.5$, $0 \leq b < 0.5$ and $0 < e \leq 0.2$;

4. The radiation image conversion panel described in 3., wherein in formula (1), $M^1$ is an alkali metal selected from the group consisting of K, Rb and Cs;

5. The radiation image conversion panel described in 3. or 4., wherein in formula (1), X is Br or I;

6. The radiation image conversion panel described in any of 3., 4. and 5., wherein in formula (1), $M^2$ represents a divalent metal selected from the group consisting of Be, Mg, Ca, Sr and Ba;

7. The radiation image conversion panel described in any of 3. through 6., wherein in formula (1), $M^3$ represents a trivalent metal selected from the group consisting of Y, Ce, Sm, Eu, Al, La, Gd, Lu, Ga and In;

8. The radiation image conversion panel described in any of 3. through 7., wherein in formula (1), $0 \leq b \leq 10^{-2}$;

9. The radiation image conversion panel described in any of 3. through 8., wherein in formula (1), A is a metal selected from the group consisting of Eu, Cs, Sm, Tl and Na;

10. The radiation image conversion panel described in any of 3. through 9., wherein the stimulable phosphor represented by formula (1) is a stimulable phosphor represented by the following formula (2):

$$CsX:A \qquad \text{formula (2)}$$

wherein X represents Br or I; A represents Eu, In, Tb or Ce.

11. The radiation image conversion panel described in 1., wherein the stimulable phosphor layer is formed by a vapor deposition process.

12. A reading apparatus using the radiation image conversion panel described in any of the foregoing 1. through 10., wherein the stimulable phosphor layer of the radiation image conversion panel is exposed to a laser beam having a diameter of not more than 100 μm.

DETAILED DESCRIPTION OF THE INVENTION

One aspect of the invention is a radiation image conversion panel comprising a support having thereon a stimulable phosphor layer comprising columnar stimulable phosphor crystals which have been formed in a vapor phase deposition process, wherein the tip of the respective columnar crystals exhibits 20° to 80° with respect to an angle (θ) formed between the centerline in the direction of crystal growth and a line tangent to a section of the tip having said the centerline.

The present invention has come into being as a result of extensively studying the shape of a stimulable phosphor comprised of columnar crystals, which were formed on a support through vapor-phase deposition (also called gas phase growth), it was discovered by the inventors of this application that the top portion of the columnar crystal exhibited an acute angle at the tip, thereby leading to enhanced luminance and superior sharpness. It was contemplated that, when X-rays enter the stimulable phosphor layer (hereinafter, also denoted simply as phosphor layer), scattering caused on the surface of the phosphor layer was prevented by the tip having an acute specified angle, leading to enhanced output of absorbed X-rays.

Figure 1:
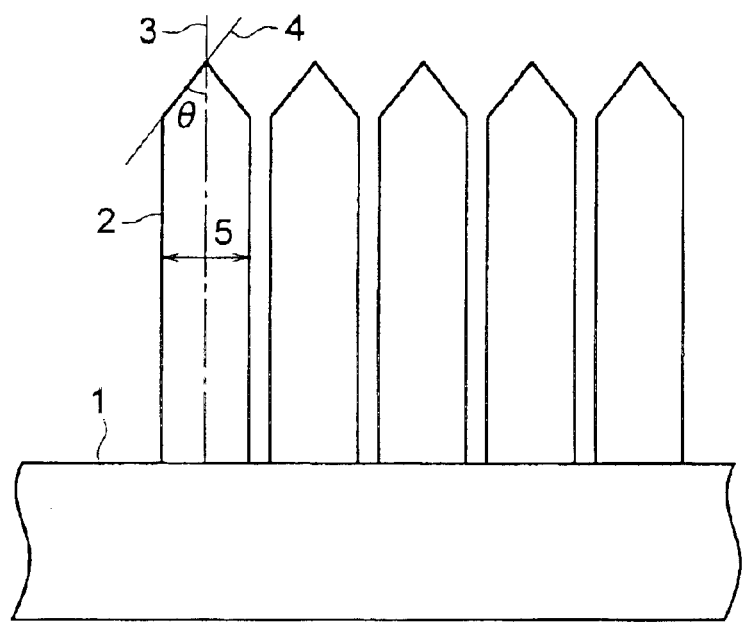
FIGS. 1(a) and 1(b) illustrate forms of columnar crystals formed on the support.
Figure 1:
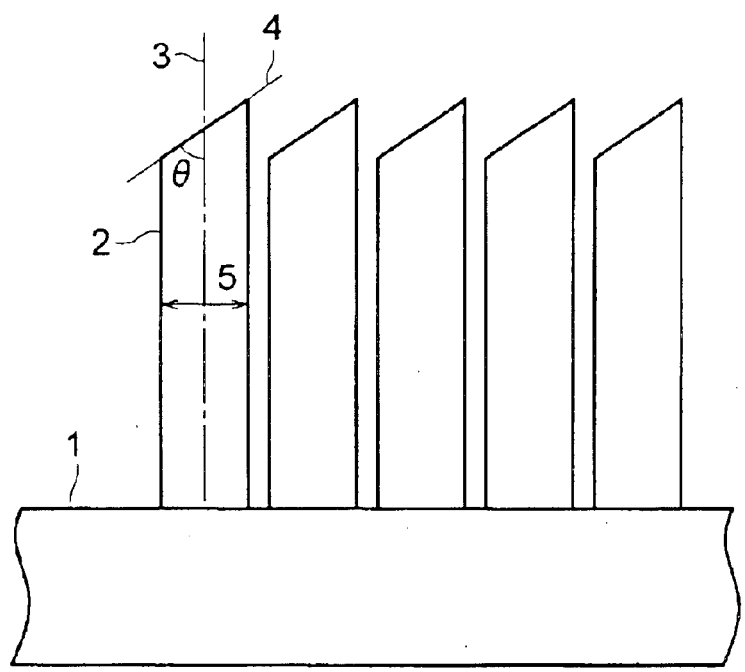

FIGS. 1(a) and 1(b) exemplarily illustrate forms of columnar crystals formed on the support. In FIGS. 1(a) and 1(b), the numeral 2 designates a columnar crystal of a stimulable phosphor, which has been formed on a support (1) by the vapor-phase deposition process and at the tip of the columnar crystal, the symbol θ designates the angle at the intersection of a centerline (3) passing through the center in the direction of crystal growth and a tangent line (4) to the tip section along the centerline (hereinafter, also denoted simply as a tip angle), which is 20 to 80 degrees, and preferably 40 to 80 degrees. In the invention, the tip angle refers to an average value of tip angles of at least 100 columnar crystals, which are viewed and measured via an electron microscope. FIG. 1(a) shows columnar crystals having an acute tip, substantially centered on the columnar crystal, i.e., near the center (or centerline) of the columnar crystal. FIG. 1(b) shows columnar crystals having an inclined tip, in which the acute site exists across the full surface of the top of the columnar crystals. The columnar crystals grow upwardly from the support. The centerline (3) passing through the center in the direction of crystal growth (or center line in the direction of crystal growth) refers to a straight line connecting a midpoint on the crystal face in contact with the support (i.e., the midpoint on the lowermost surface of a columnar crystal) and a midpoint on the uppermost surface of the columnar crystal.

The means for allowing the tip to have an angle as defined in the invention is not limited, which can be achieved by optimal selection of crystal growth conditions, such as support temperature, degree of vacuum, crystal growth speed and kind of stimulable phosphor.

In one preferred embodiment of the invention, the columnar crystals have an average column diameter of not less than 0.5 μm and not more than 50 μm, and preferably not less than 1 μm and not more than 50 μm. Haze of the stimulable phosphor layer can be reduced by making the average column diameter of the columnar crystals have a value falling within the range described above, resulting in enhanced sharpness. In the invention, the diameter of a columnar crystal refers to the diameter of a circle having an area equivalent to the sectional area of the columnar crystal when observed vertical to the support, that is the so-called circular equivalent diameter. The average diameter can be determined by electron-microscopic observation and at least 100 columnar crystals are so observed for the average diameter.

The diameter of the columnar crystal is affected by the temperature of the support, the degree of vacuum and the incident angle of the vapor stream, so that columnar crystals of a desired diameter can be prepared by controlling these factors. The lower temperature of the support tends to render the crystals thinner but excessively low temperature makes it difficult to maintain the columnar form. The temperature of a support is preferably 100 to 300° C., and more preferably 150 to 270° C. the incident angle of the vapor stream is preferably 0 to 5°, and the degree of vacuum is preferably not more than $1.3 \times 10^{-1}$ Pa.

Next, the vapor deposition relating to the invention will be described.

Examples of stimulable phosphors usable in the stimulable phosphor layer, prepared in the vapor deposition process include a phosphor represented by $BaSO_4:Ax$, as described in JP-A No. 48-80487; phosphor represented by $MgSO_4:Ax$, as described in JP-A No. 48-80488; phosphor represented by $SrSO_4:Ax$, as described in JP-A No. 48-80489; phosphors $Na_2SO_4$, $CaSO_4$ or $BaSO_4$ added with at least one of Mn, Dy and Tb, as described in JP-A No. 51-29889; phosphors BeO, LiF, $MgSO_4$ and $CaF_2$, as described in JP-A No. 52-30487; phosphor $Li_2B_4O_7:Cu,Ag$, as described in JP-A No. 54-47883; and SrS:Ce, Sm, SrS:Eu, Sm, $La_2O_2S:Eu$, Sm and $(Zn, Cd)S:Mn_x$, as described in U.S. Pat. No. 3,859,527. There are also cited ZnS:Cu, Pb phosphor and alkaline earth metal silicate type phosphors represented by general formula, $BaO.xAl_2O_3:Eu$, as described in JP-A No. 55-12142.

There are further cited an alkaline earth fluorohalide phosphor represented by general formula of $(Ba_{1-x-y}Mg_xCa_y)F_x:Eu^{2+}$, as described in JP-A No. 55-12143; phosphor represented by general formula: LnOX:xA, as described in JP-A No. 55-12144; phosphor represented by general formula of $(Ba_{1-x}M(II)_x)F_x:yA$, as described in JP-A No. 55-12145; phosphor represented by general formula of BaFX:xCe,yA, as described in JP-A No. 55-84389; rare earth-activated divalent metal fluorohalide phosphor represented by general formula of M(II)FX.xA:yLn, as described in JP-A No. 55-160078; phosphor represented by general formula of ZnS:A,CdS:A, (Zn,Cd)S:A, X; phosphor represented by general formulas of $xM_3(PO_4)_2.NX_2:yA$ and $xM_3(PO_4)_2:yA$, as described in JP-A No. 59-38278; phosphor represented by general formulas of $nReX_3.mAX'_2:xEu$ and $nReX_3.mAX'_2:xEu$, ySm, as described in JP-A No. 59-155487; alkali halide phosphor represented by general formula of $M(I)X.aM(II)X'_2.bM(III)X''_3:cA$, as described in JP-A No.61-72087; and bismuth-activated alkali halide phosphor represented by general formula of M(I)X:xBi, as described in JP-A No. 61-228400. Specifically, alkali halide phosphors easily, which form a columnar stimulable phosphor layer by the vacuum evaporation method or the sputter method are preferred.

A stimulable phosphor represented by the following formula (1) is preferred in the invention:

$$M^I X.aM^{II}X'_2.bM^{III}X''_3:eA \qquad \text{formula (1)}$$

wherein $M^1$ represents an alkali metal selected from the group consisting of Li, Na, K, Rb and Cs; $M^2$ represents a divalent metal selected from the group consisting of Be, Mg, Ca, Sr, Ba, Zn, Cd, Cu and Ni; $M^3$ represents a trivalent metal selected from the group consisting of Sc, Y, La, Ce, Pr, Nd, Pm, Sm, Eu, Gd, Tb, Dy, Ho, Er, Tm, Yb, Lu, Al, Ga and In; X, X' and X" each represent a halogen selected from the group consisting of F, Cl, Br and I; A represents a metal selected from the group consisting of Eu, Tb, In, Ga Cs, Ce, Tm, Dy, Pr, Ho, Nd, Yb, Er, Gd, Lu, Sm, Y, Tl, Na, Ag, Cu and Mg; a, b and e are each $0 \leq a < 0.5$, $0 \leq b < 0.5$ and $0 < e \leq 0.2$. Further, in formula (1), $M^1$ preferably is an alkali metal selected from the group consisting of K, Rb and Cs; X preferably is Br or I; $M^2$ preferably is a divalent metal selected from the group consisting of Be, Mg, Ca, Sr and Ba; $M^3$ preferably is a trivalent metal selected from the group consisting of Y, Ce, Sm, Eu, Al, La, Gd, Lu, Ga and In; be preferably is $0 \leq b \leq 10^{-2}$; A preferably is a metal selected from the group consisting of Eu, Cs, Sm, Tl and Na.

Furthermore, the columnar crystals relating to the invention preferably comprise, as a main component, a stimulable phosphor represented by the following formula (2):

$$CsX:A \qquad \text{formula (2)}$$

wherein X represents Br or I; A represents Eu, In, Tb or Ce.

In such a vapor-phase deposition method, vapor of a stimulable phosphor or raw material thereof is supplied onto a support at a specific angle toward the support to allow crystals to perform vapor-phase growth (vapor-phase deposition) to form a stimulable phosphor layer having long, thin columnar crystal structures which exist independently. Upon vacuum evaporation, the columnar crystals can be grown at a growing angle which is about half of the incident angle of the vapor stream of the stimulable phosphor.

To supply the vapor stream of a stimulable phosphor or raw material thereof at an incident angle toward the support surface, the support and a crucible containing an evaporation source may be arranged so as to be inclined with each other. Alternatively, the support and the crucible which are arranged parallel to each other may be controlled so that only an inclined component from the evaporating surface of the crucible having an evaporation source deposits on the support using a slit. In such as case, the shortest spacing between the support and the crucible is preferably 10 to 60 cm so as to fit the average flight of the stimulable phosphor.

In the formation of a stimulable phosphor layer by the vapor-phase deposition methods described above, a stimulable phosphor as an evaporation source may be melted homogeneously or molded by a press or hot-press, followed by being charged into a crucible. Further, it is preferred to conduct a degassing treatment. Evaporation of a stimulable phosphor from the evaporation source can be conducted by scanning with electron beams ejected from an electron gun but other methods may be applied to perform the evaporation. The evaporation source is not necessarily a stimulable phosphor and raw material of a stimulable phosphor may be mixed thereto.

With respect to activators, a mixture of an activator with basic substance may be evaporated. Alternatively, the basic substance is evaporated, followed by doping the activator. For example, RbBr, as basic substance is evaporated alone, followed by doping Tl as an activator. In this case, since respective crystals exist isolatedly, doping becomes feasible even in the case of a thick phosphor layer and difficulty io proceeding crystal growth results in no reduced MTF. Doping is performed by allowing a doping agent (dopant) to be introduced into the basic substance layer of a phosphor by means of thermal diffusion or ion injection.

The spacing between respective columnar crystals is preferably not more than 30 μm, and more preferably not more than 5 μm. Spacing exceeding 30 μm lowers the filling ratio of a phosphor of the phosphor layer.

A vacuum evaporation method, a sputter deposition method and a CVD method have been employed to allow the stimulable phosphor to perform gas-phase growth (vapor deposition) to form columnar crystals.

Vacuum evaporation is conducted in such a manner that after placing a support in an evaporation apparatus, the inside of the apparatus is evacuated to a vacuum degree of $1.333 \times 10^{-4}$ Pa and subsequently, at least a stimulable phosphor is evaporated with heating by the resistance heating method or electron-beam method to cause the phosphor to deposit at a slant on the surface of the support to a desired thickness. As a result, a stimulable phosphor layer containing no binder is formed, provided that the foregoing evaporation stage may be divided into plural times to form the stimulable phosphor layer. In this evaporation stage, plural resistance heaters or electron beams may be used to perform vacuum evaporation. Alternatively, raw material of a stimulable phosphor is evaporated using plural resistance heaters or electron beams and an intended stimulable phosphor is synthesized on the support, simultaneously forming a stimulable phosphor layer. Vacuum evaporation may be conducted while cooling or heating the substrate to be deposited thereon. After completion of vacuum evaporation, the stimulable phosphor layer may be subjected to a heating treatment.

Sputter deposition is conducted in such a manner that after setting a support in a sputtering apparatus, the inside of the apparatus is evacuated to a vacuum level of $1.333 \times 10^{-4}$ Pa and then inert gas used for sputtering such as Ar and Ne is introduced thereto at a gas pressure of ca. $1.333 \times 10^{-1}$ Pa, subsequently, sputtering is carried out in the inclined direction with tagetting the stimulable phosphor to cause the phosphor to deposit at a slant on the surface of the support so as to have a desired thickness. Similarly to the vacuum evaporation, the sputtering stage may be divided to plural steps to form a stimulable phosphor layer. Sputtering to the target may be carried out concurrently or successively to form a stimulable phosphor layer. Using plural raw materials of a stimulable phosphor as a target, sputtering is simultaneously or successively carried out to form an intended stimulable phosphor layer on the support. Gas such as $O_2$ and $H_2$ may optionally introduced to perform reactive sputtering. Sputtering may be carried out while heating or cooling substrate to be deposited thereon. After completion of sputtering, the stimulable phosphor layer may be subjected to a heating treatment.

CVD (Chemical Vapor Deposition) is a method in which an intended stimulable phosphor or an organic compound containing a raw material of the stimulable phosphor is degraded using energy such as heat or high-frequency electric power to form a stimulable phosphor layer containing no binder on the support, which enables growing respectively long thin columnar crystals in the inclined direction toward the line normal to the surface of the support.

The thickness of the thus formed stimulable phosphor layer, depending on radiation sensitivity to radiation of an intended radiation image conversion panel and the kind of stimulable phosphor, is preferably 10 to 1000 μm, and more preferably 20 to 800 μm.

Figure 2:
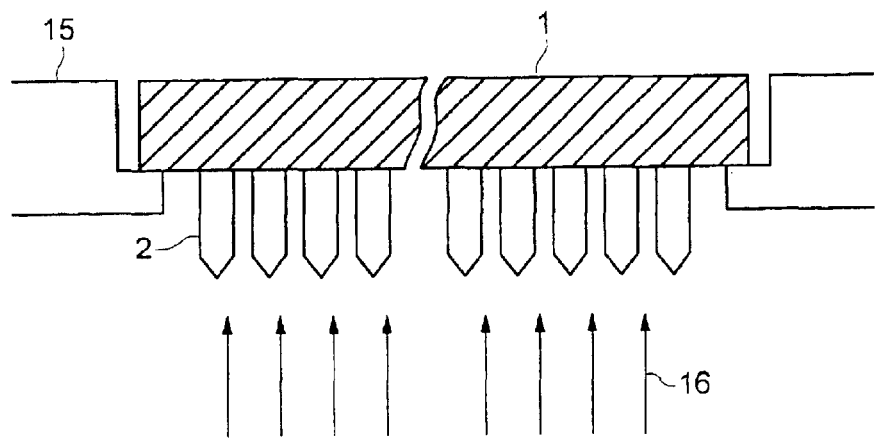
FIG. 2 illustrates the mode of forming a stimulable phosphor layer on a support by the vapor deposition process.

Next, formation of the stimulable phosphor layer relating to the invention will be described based on FIG. 2. FIG. 2 illustrates the mode of forming a stimulable phosphor layer on a support by the vacuum evaporation method, in which vapor streams (16) of a stimulable phosphor are introduced at an incident angle of 0 to 5° to the line normal to the support surface to form columnar crystals on the support.

The stimulable phosphor layer formed on the support contains no binder, leading to superior directionality and enhanced directionality of stimulating light and stimulated luminescence and enabling formation of a thicker phosphor layer, as compared to radiation image conversion panel having a dispersion-type stimulable phosphor layer, in which a stimulable phosphor is dispersed in a binder. Moreover, reduced scattering of stimulating light in the stimulable phosphor layer results in enhanced sharpness.

Further, spacing between columnar crystals may be filled with a filler such as a binder to strengthen the phosphor layer. Furthermore, material exhibiting relatively high light absorbance or high reflectance may be used as filler. The use thereof prevents lateral diffusion of stimulating light entering into the phosphor layer, in addition to the foregoing strengthening effect. The material exhibiting high reflectance refers to one exhibiting a high reflectance with respect to stimulating light (500 to 900 nm, specifically 600 to 800 nm), including metals such as aluminum, magnesium, silver and indium, white pigments and colorants ranging green to red.

White pigments can also reflect stimulating light. Examples thereof include $TiO_2$ (anatase type, rutile type), MgO, $PbCO_3$, $Pb(OH)_2$, $BaSO_4$, $Al_2O_3$, M(II)FX [in which M(II) is at least one of Ba, Sr and Ca, X is at least one of Cl and Br], $CaCO_3$, ZnO, $Sb_2O_3$, $SiO_2$, $ZrO_2$, lithopone ($BaSO_4 \cdot ZnS$), magnesium silicate, basic lead silisulfate, and aluminum silicate. These pigments exhibit high covering power and have a refractive index high, whereby stimulated luminescence is easily scattered through reflection or refraction, leading to enhanced sensitivity of the radiation image conversion panel.

Examples of material exhibiting high light absorbance include carbon, chromium oxide, nickel oxide, iron oxide, and blue colorants. Of these, carbon absorbs stimulated luminescence.

Colorants may be any organic or inorganic colorants. Examples of organic colorants include Zapon Fastblue 3G (produced by Hoechst A.G.), Estrol Brillblue N-3RL (produced by Sumitomo Chemical Ind. Co. Ltd.), D6CBlue No. 1 (produced by National Aniline Co.), Spirit Blue (produced by HODOGAYA KAGAKU Co., Ltd.), Oilblue No. 603 (produced by Orient Co., Ltd.), Kiton Blue A (produced by Chiba Geigy Co.), Aisen Catironblue GLH (produced by HODOGAYA KAGAKU Co., Ltd.), Lakeblue AFH (produced by KYOWA SANGYO Co., Ltd.), Primocyanine 6GX (produced by INAHATA SANGYO o. Ltd.), Briilacid Green 6BH (produced by HODOGAYA KAGAKU Co., Ltd.), Cyanblue BNRCS (produced by Toyo Ink Co., Ltd.), and Lyonoyl Blue SL (produced by Toyo Ink Co., Ltd.). There are also cited organic metal complex colorants such as Color Index 24411, 23160, 74180, 74200, 22800, 23154, 23155, 24401, 14830, 15050, 15760, 15707, 17941, 74220, 13425, 13361, 13420, 11836, 74140, 74380, 74350 and 74460. Examples of inorganic colorants include ultramarine, cobalt blue, celureun blue, chromium oxide, and $TiO_2$—ZnO—NiO type pigments.

Supports used in the radiation image conversion panel of the invention include a variety of polymeric materials, glass, ceramics and metals. Preferred examples thereof include plate glass such as quartz, borosilicate glass, chemically tempered glass and crystallized glass; ceramics such as alumina and silicon nitride; plastic film such as cellulose acetate film, polyester film, polyethylene terephthalate film, polyamide film, polyimide film, triacetate film, and polycarbonate film; metal sheets such as aluminum, iron, copper and chromium, and metal sheet covered with a hydrophilic fine particle layer. The support may be smooth-surfaced, or it may be matted in order to enhance adhesion of the support to the stimulable phosphor layer. To enhance adhesion between the support and stimulable phosphor layer, the surface of the support may optionally be provided with an adhesion promoting layer in advance. A thickness of the support, depending on material, is usually 80 to 2000 $\mu$m, and preferably 80 to 1000 $\mu$m in terms of handling.

The stimulable phosphor layer may be provided thereon with a protective layer. The protective layer may be formed by coating a coating composition for the protective layer on the stimulable phosphor layer or the protective layer which was previously prepared may be adhered to the support. Alternatively, a procedure of forming a stimulable phosphor layer on the protective layer which was previously prepared is also applicable. Materials used for the protective layer include those which are usually used for protective layers. Examples thereof include cellulose acetate, nitrocellulose, polymethyl methacrylate, polyvinyl butyral, polyvinyl formal, polycarbonate, polyester, polyethylene terephthalate, polyethylene, polyvinylidene chloride, nylon, polytetrafluoroethylene, polytrifluoroethylene, copolymer of terafluoroethylene and hexafluoropropylene, copolymer of vinylidene chloride and vinyl chloride, and copolymer of vinylidene chloride and acrylonitrile. Further, a transparent glass substrate may be used as a support. Furthermore, inorganic material such as SiC, $SiO_2$, SiN, and $Al_2O_3$ may be allowed to deposit by means of the vacuum evaporation or sputtering method to form the protective layer. The thickness of a protective layer is preferably 0.1 to 2,000 $\mu$m.

Figure 3:
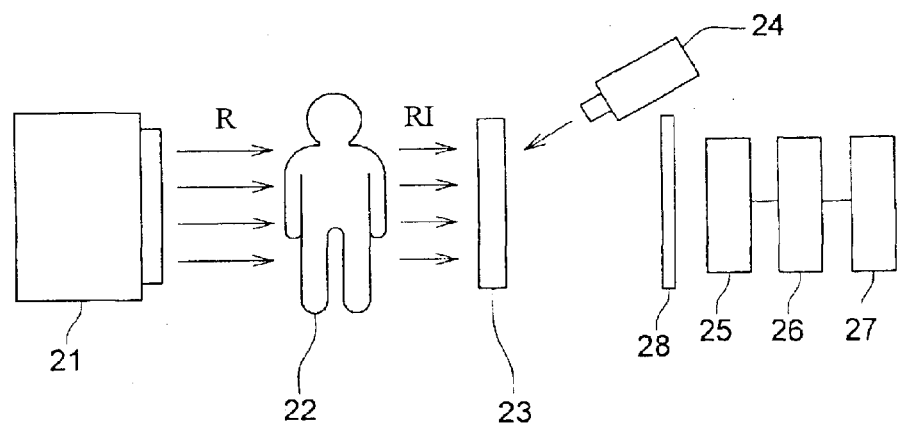
FIG. 3 illustrates a reading apparatus using the radiation image conversion panel.

FIG. 3 illustrates a reading apparatus using the radiation image conversion panel relating to the invention. In FIG. 3, the numeral 21 represents a radiation generating apparatus, 22 represents an object, 23 represents a radiation image conversion panel having a visible- or infrared-stimulable phosphor layer, 24 represents a stimulating light source to cause a latent image stored in the radition image conversion panel (23) to be emitted as stimulated luminescence, 25 represents a photoelectric conversion apparatus to detect the stimulated luminescence emitted from the radiation image conversion panel (23), 26 represents an image reproduction apparatus to reproduce photoelectric conversion signals detected in the photoelectric conversion apparatus (25) in the form of an image, 27 represents a display apparatus to display reproduced images, and 28 represents a filter for reflected light from a light source (24) to allow only light emitted from the radiation image conversion panel (23) to pass therethrough. FIG. 3 shows an example of obtaining a transmission-type radiation image, and in cases where the object (22) itself radiates radiation rays, a radiation generation apparatus (21) may not be required. An apparatus subsequent to the photoelectric conversion (25) apparatus may be any one which is capable of reproducing light information from the radiation image conversion panel (23), in any image form.

As shown in FIG. 3, when the object (22) is arranged between the radiation generation apparatus (21) and the radiation image conversion panel (23), and exposed to radiation (R), the radiation (R) transmits the respective portions of the object (22) in accordance with radiation transmittance thereof and the resulting transmission image (also denoted as RI), i.e., an image having different radiation intensities enters the radiation image conversion panel (23). The thus entered transmission image (RI) is absorbed in a stimulable phosphor layer of the radiation image conversion panel (23), in which electrons and/or holes are generated in proportion to the dose of the absorbed radiation and accumulated at a trap level of the stimulable phosphor to form a latent image accumulating energies of the radiation transmission image. Subsequently, the latent image is excited with light energy to form an actual image, i.e., the stimulated phosphor layer is irradiated with the light source (24) irradiating visible or infrared light to eject the electrons and/or holes accumulated on the trap level to emit the accumulated energy in the form of stimulated luminescence. The intensity of the emitted luminescence is proportional to the number of accumulated electrons and/or holes, that is, energy of the radiation absorbed in the stimulable phosphor of the radiation image conversion panel (23). The thus obtained light signals are converted to electric signals by the photoelectric conversion (25) apparatus such as a phototmultiplier, which are reproduced as an image in image processor (26), displaying the image in image display apparatus (27). As the image processor (26) it is effective to employ one which not only reproduces the electric signals as the image signal but one which can also conduct image processing, computation, memory and storage of the image.

The stimulated luminescence emitted from the stimulable phosphor layer, having a spectral distribution in the lower wavelength region is preferable, based on the reason that the stimulated luminescence emitted from the stimulable phosphor layer is required to be separated from the reflected stimulating light and photoelectric converters to receive the luminescence emitted from the stimulable phosphor layer, in general, are provided with a sensor having higher sensitivity to light energy of 600 nm or less. Emission of stimulable phosphors relating to the invention falls within the wavelength region of 300 to 500 nm and the stimulating light wavelength is 500 to 900 nm, satisfying the foregoing conditions. Further, along with a recent trend of down-sizing diagnostic apparatuses, semiconductor lasers which exhibit a higher output and are capable of being further down-sized are preferably employed for use in reading images of the radiation image conversion panel. The semiconductor laser has a wavelength of 680 nm and the stimulable phosphor used in the radiation image conversion panel of the invention exhibits extremely superior sharpness when using a stimulating light of 680 nm. Thus, the stimulable phosphors relating to the invention emit luminescence having a main peak at 500 nm or less, which is easily separable from the stimulating light and compatible with spectral sensitivity of the receiver, leading to enhanced light-receiving efficiency and enhanced sensitivity of an image receiving system.

Light sources including the stimulating wavelength for the stimulable phosphor used in the radiation image conversion panel (23) are used as the stimulating light source (24). Specifically, the use of laser light simplifies an optical system and leads to enhanced stimulating light intensity, resulting in preferable performance.

The beam diameter of a laser irradiated onto the stimulable phosphor layer of the invention is preferably not more than 100 nm, and more preferably not more than 80 nm. Examples of the laser include an He—Ne laser, He—Cd laser, Ar ion laser, Kr laser, $N_2$ laser, YAG laser and its second harmonic wave, ruby laser, semiconductor laser, various dye lasers, and metal vapor lasers such as a copper vapor laser. Of these, continuous oscillation lasers such as an He—Ne laser and an Ar ion laser are usually desirable, and pulse-oscillated lasers are also usable by synchronizing the pulse with a scanning time for one pixel of the panel. In cases when employing retarded emission for separation, instead of using the filter (28), the use of the pulse-oscillated laser is preferable rather than modulation of the continuous oscillation laser, as described in JP-A No. 59-22046. Of the various laser light sources described above, semiconductor lasers are specifically preferred in terms of being compact, inexpensive and not requiring a modulator.

The filter (28) cuts reflected stimulating light and allows the stimulated luminescence emitted from the radiation image conversion panel (23) to transmit, which is determined by the combination of the stimulated emission wavelength of a stimulable phosphor contained in the radiation image conversion panel (23) and the stimulating light source (24). In the preferred practical combination of a stimulating light wavelength of 500 to 900 nm with a stimulated emission wavelength of 300 to 500 nm, for example, violet to blue glass filters are used, such as C-39, C-40, V-40, V-42 and V-44 (available from TOSHIBA CORP.), 7-54 and 7-59 (available from Corning Co.), BG-1, BG-3, BG-25, BG-37 and BG-38 (available from Spectrofilm Co.). Interference filters are usable by selecting specific filters. The photoelectric conversion apparatus (25) usable in the invention includes any one capable of converting variation of luminous energy to electric signal, such as a photoelectric tube, a photomultiplier, a photodiode, a phototransistor, a solar cell, and photoconductive elements.

EXAMPLES

The present invention will be further described based on examples but is by no means limited to these embodiments.

Preparation of Radiation Image Conversion Panel

Preparation of Radiation Image Conversion Panel 1

Figure 4:
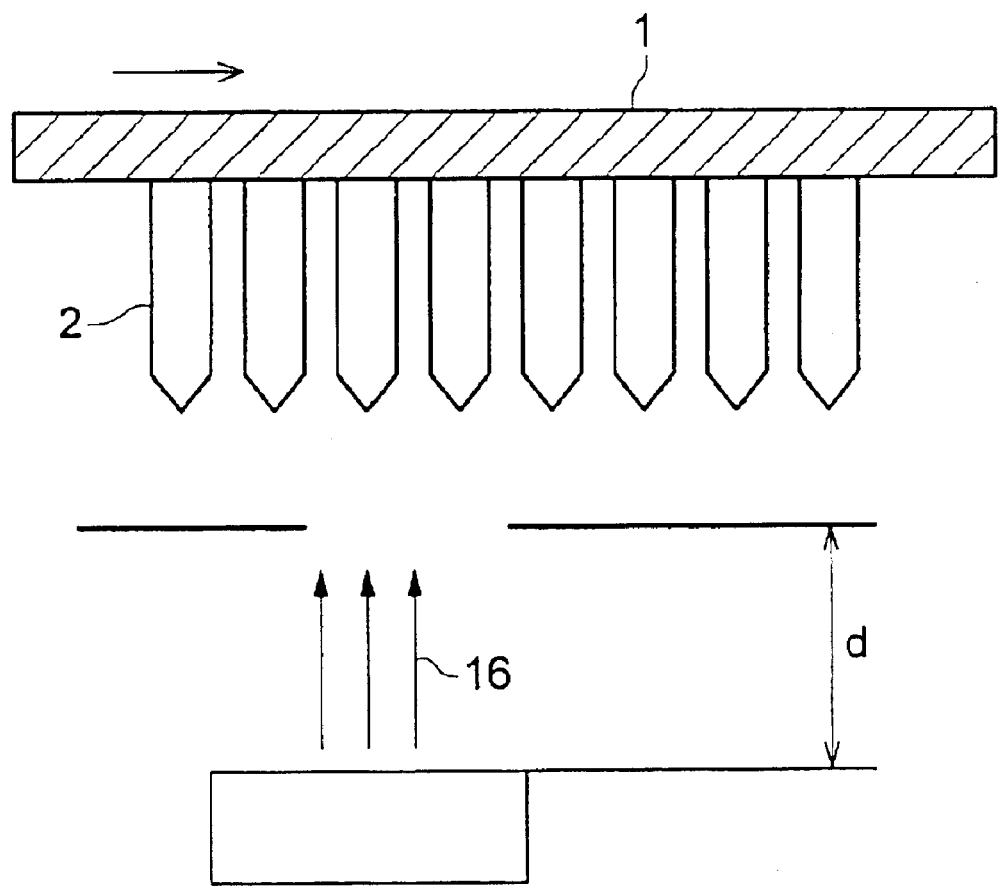
FIG. 4 illustrates an example of a vacuum evaporation apparatus used in the invention.

The surface of a 1 mm thick crystallized glass support 1 (produced by Nippon Denki Glass Co., Ltd.) was heated to 200° C. and using a vacuum evaporation apparatus as shown in FIG. 4, an alkali halide phosphor (CsBr:0.0005 Eu) was introduced using an aluminum slit at an angle of 5° to the line normal to the surface of the support 1 and at a distance (d) of 60 cm between the support 1 and a evaporation source with transporting the support 1 in the parallel direction to form a 300 $\mu$m thick stimulable phosphor layer, which comprised columnar crystals exhibiting 35° of an average angle at the tip (hereinafter also denoted as tip angles) and the average diameter of 5 $\mu$m).

In the vacuum evaporation, the support was set in the evaporation chamber of an evaporator and then, phosphor raw material, as an evaporation source (CsBr:0.0005Eu) which was previously molded in a press was put into a water-cooled crucible. Thereafter, the inside of the evaporator was evacuated and after introducing $N_2$ gas to adjust a degree of vacuum of $6.65 \times 10^{-4}$ Pa, vacuum evaporation was conducted to perform vapor deposition, while maintaining the support temperature (also called substrate temperature) at 200° C. The vapor deposition was completed when the thickness of the stimulable phosphor layer reached 300 $\mu$m and then, the phosphor layer was subjected to a heating treatment at 400° C.

Subsequently, a pacer was provided around the circumferential portion of the glass support having the stimulable phosphor layer and a protective glass, as a protective layer was provided thereon to form a low refractive air layer of 300 $\mu$m thickness between the phosphor layer and the protective glass. In this case, a glass spacer was placed so as to form an air layer at the edge portion of the plate and further thereon, the protective glass was provided. The glass spacer was stuck to circumferential portions of the support and the protective glass with an epoxy-type adhesive (product by Three-Bond Co., Ltd.) to prepare radiation image conversion panel 1.

Protective glass: non-coloring transparent glass (having a thickness of 550 $\mu$m and exhibiting a refractive index of 1.52 and a transmittance of 80% for stimulating light of semiconductor laser of 680 nm)

Subsequently, radiation image conversion panels 2 through 6 were prepared similarly to the radiation image conversion panel 1, provided that a stimulable phosphor layer comprising columnar crystals having a tip angle ($\theta$) and an average column diameter ($\mu$m), as shown in Table 1. The tip angle fell within the range of ±5° of the value indicated in the Table The section of the phosphor layer of each sample was electron-microscopically observed to determine the tip angle and the average column diameter of the columnar crystals.

The thus prepared radiation image conversion panels were measured with respect to luminance and sharpness in accordance with the following procedure.

Luminance

Each of the radiation image conversion panels was uniformly exposed to X-rays at a bulb voltage of 80 kVp, followed by stimulating the exposed panel by scanning with semiconductor laser (633 nm) beam of a 80 $\mu$m beam diameter, and stimulated luminescence emitted from the phosphor layer was received by a receptor (photomultiplier having spectral sensitivity of S-5) to determine the intensity thereof. The thus obtained intensity was defined as luminance, which was represented by a relative value, based on that of radiation image conversion panel 5 being 1.00.

Sharpness

After a lead CTF chart was adhered to the respective radiation image conversion panels, each of the panels were exposed, through the CTF chart, to X-ray at a bulb voltage of 80 kVp, followed by stimulating the exposed panel by scanning with semiconductor laser (633 nm) beam of a 80 $\mu$m beam diameter, and stimulated luminescence emitted from the phosphor layer was received by a receptor to perform conversion to electric signals, which were subjected to analog/digital conversion and recorded on a hard disc. The record was analyzed using a computer to measure a modulation transfer function (MTF) of the image recorded on the disc. The MTF value (in terms of %) at a spatial frequency of 11 p/mm was determined. The higher MTF value indicates superior sharpness. Thus, radiation image conversion panels exhibiting the MTF value of 50% or more result in superior sharpness.

Furthermore, radiation image conversion panels 2 and 5 were similarly measured to determine relative values of luminance and sharpness, provided that the beam diameter of the semiconductor laser was changed to 120 $\mu$m.

Results are shown in Table 1.

TABLE 1

| Panel No. | Formation of Columnar Crystal | | Shape of Columnar Crystal | | Evaluation | | | Remark |
|---|---|---|---|---|---|---|---|---|
| | Vacuum Degree (Pa) | Support Temp. (° C.) | Tip Angle (°) | Av. Diameter ($\mu$m) | Laser Beam ($\mu$m) | Luminance | Sharpness (11 p/mm) | |
| 1 | $6.66 \times 10^{-4}$ | 200 | 35 | 5 | 80 | 1.8 | 80 | Inv. |
| 2 | $2.66 \times 10^{-1}$ | 200 | 45 | 10 | 80 | 1.4 | 76 | Inv. |
| 2 | $2.66 \times 10^{-1}$ | 200 | 45 | 10 | 120 | 1.5 | 68 | Inv. |
| 3 | $2.66 \times 10^{-2}$ | 200 | 70 | 10 | 80 | 1.6 | 78 | Inv. |
| 4 | $2.66 \times 10^{-1}$ | 350 | 45 | 30 | 80 | 1.7 | 72 | Inv. |
| 5 | 1.33 | 200 | 83 | 60 | 80 | 1.0 | 42 | Comp. |
| 5 | 1.33 | 200 | 83 | 60 | 120 | 1.0 | 35 | Comp. |
| 6 | 1.33 | 350 | 88 | 70 | 80 | 0.9 | 38 | Comp. |

As apparent from Table 1, it was proved that inventive radiation conversion panels, in which columnar stimulable phosphor crystals had a tip exhibiting an angle of 20 to 80° between a centerline in the direction of crystal growth and a line tangent to a section of the tip having the centerline, resulted in superior sharpness as well as enhanced luminance, compared to comparative panels.

What is claimed is:

1. A radiation image conversion panel comprising a support having thereon a stimulable phosphor layer comprising columnar stimulable phosphor crystals, wherein the columnar crystals have a tip exhibiting an average angle of 20° to 80° which a centerline in the direction of crystal growth makes with a line tangent to a section of the tip having the centerline.

2. The radiation image conversion panel of claim 1, wherein the columnar crystals have an average diameter of 0.5 to 50 $\mu$m.

3. The radiation image conversion panel of claim 1, wherein the columnar crystals are a stimulable phosphor represented by the following formula (1)

$$M^1X.aM^2X'_2.bM^3X''_3:eA \qquad \text{formula (1)}$$

wherein $M^1$ represents an alkali metal selected from the group consisting of Li, Na, K, Rb and Cs; $M^2$ represents a divalent metal selected from the group consisting of Be, Mg, Ca, Sr, Ba, Zn, Cd, Cu and Ni; $M^3$ represents a trivalent metal selected from the group consisting of Sc, Y, La, Ce, Pr, Nd, Pm, Sm, Eu, Gd, Tb, Dy, Ho, Er, Tm, Yb, Lu, Al, Ga and In; X, X' and X" each represent a halogen selected from the group consisting of F, Cl, Br and I; A represents a metal selected from the group consisting of Eu, Tb, In, Ga, Cs, Ce, Tm, Dy, Pr, Ho, Nd, Yb, Er, Gd, Lu, Sm, Y, Tl, Na, Ag, Cu and Mg; a, b and e are each $0 \leq a < 0.5$, $0 \leq b < 0.5$ and $0 \leq e < 0.2$.

4. The radiation image conversion panel of claim 3, wherein in formula (1), $M^1$ is an alkali metal selected from the group consisting of K, Rb and Cs.

5. The radiation image conversion panel of claim 3, wherein in formula (1), X is Br or I.

6. The radiation image conversion panel of claim 3, wherein in formula (1), $M^2$ represents a divalent metal selected from the group consisting of Be, Mg, Ca, Sr and Ba.

7. The radiation image conversion panel of claim 3, wherein in formula (1), $M^3$ represents a trivalent metal selected from the group consisting of Y, Ce, Sm, Eu, Al, La, Gd, Lu, Ga and In.

8. The radiation image conversion panel of claim 3, wherein in formula (1), b is $0 \leq b \leq 10^{-2}$.

9. The radiation image conversion panel of claim 3, wherein in formula (1), A is a metal selected from the group consisting of Eu, Cs, Sm, Tl and Na.

10. The radiation image conversion panel of claim 3, wherein the stimulable phosphor represented by formula (1) is a stimulable phosphor represented by the following formula (2):

$$CsX:A \qquad \text{formula (2)}$$

wherein X represents Br or I; A represents Eu, In, Tb or Ce.

11. The radiation image conversion panel of claim 1, wherein the stimulable phosphor layer is formed by a vapor deposition process.

12. The radiation image conversion panel of claim 11, wherein the process comprises causing a vapor stream of a stimulable phosphor to be entered into an evaporation chamber at an incident angle of 0 to 5° to the direction normal to the surface of the support to form the columnar crystals on the support.

13. The radiation image conversion panel of claim 12, wherein the support is maintained at a temperature of 100 to 300° C.

* * * * *